United States Patent
Ikeda et al.

(10) Patent No.: US 7,646,501 B2
(45) Date of Patent: Jan. 12, 2010

(54) RECOGNIZING AND SENSING A PERSON APPROACHING A PRINTER VIA AN IMAGE CAPTURING DEVICE

(75) Inventors: Hitoshi Ikeda, Kanagawa (JP); Noriji Kato, Kanagawa (JP); Hirotsugu Kashimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 866 days.

(21) Appl. No.: 11/041,947

(22) Filed: Jan. 26, 2005

(65) Prior Publication Data

US 2006/0066891 A1 Mar. 30, 2006

(30) Foreign Application Priority Data

Sep. 24, 2004 (JP) ............................. 2004-276421

(51) Int. Cl.
*G06F 3/12* (2006.01)
*G06K 15/00* (2006.01)

(52) U.S. Cl. ..................... 358/1.15; 358/1.14; 358/1.6

(58) Field of Classification Search ............... 358/1.13, 358/1.14, 1.15, 1.16, 1.17, 1.18, 1.1, 1.6, 358/1.9, 1.2, 1.5, 400, 401, 407, 434, 435, 358/436, 437, 438, 439, 468; 347/2, 3, 5, 347/14, 23; 399/1, 2, 8, 9, 10; 710/15, 17, 710/18, 19, 62, 64, 72; 380/200, 243, 255, 380/55; 348/208.1, 208.2, 208.3, 207.2, 348/207.1, 207.11; 382/115, 116, 117, 118, 382/119
See application file for complete search history.

(56) References Cited

U.S. PATENT DOCUMENTS

| | | | | |
|---|---|---|---|---|
| 6,307,640 | B1 * | 10/2001 | Motegi | 358/1.14 |
| 6,631,008 | B2 | 10/2003 | Aoki | |
| 7,460,692 | B2 | 12/2008 | Mizutani et al. | |
| 2002/0034319 | A1 | 3/2002 | Tumey et al. | |
| 2002/0105666 | A1 * | 8/2002 | Sesek | 358/1.14 |
| 2005/0275866 | A1 * | 12/2005 | Corlett | 358/1.14 |
| 2006/0092455 | A1 | 5/2006 | Maeda et al. | |

FOREIGN PATENT DOCUMENTS

| | | |
|---|---|---|
| JP | A 06-059010 | 3/1994 |
| JP | A 2002-111924 | 4/2002 |
| JP | 2002132733 A * | 5/2002 |
| JP | A-2002-149549 | 5/2002 |

OTHER PUBLICATIONS

Internet X.509 Public Key Infrastructure (PKI) Proxy Certificate Profile, dated Jun. 2004, available from <http://www.ietf.org/rfc/rfc3820.txt>, accessed Jan. 5, 2009.

* cited by examiner

*Primary Examiner*—Dov Popovici
(74) *Attorney, Agent, or Firm*—Oliff & Berridge, PLC

(57) ABSTRACT

An image forming apparatus in which a client terminal and a printer are connected to a communication network, includes an image capturing part provided in a vicinity of the printer, a recognizing part to sense a person approaching the printer and to recognize an identity of the person, based on a face image of an image captured by the image capturing part, and a control part to control the printer to perform a print job issued by the person, based on a recognition output from the recognizing part.

13 Claims, 8 Drawing Sheets

STRUCTURE OF EMBODIMENT

STRUCTURE OF EMBODIMENT

EXAMPLE OF APPROACH DETERMINING METHOD

EXAMPLE OF SETTING SCREEN OF PRINT OPTION

OPERATION OF EMBODIMENT

APPROACH DETERMINING ROUTINE

APPROACH DETERMINING ROUTINE

MODIFICATION

RECOGNIZING AND SENSING A PERSON APPROACHING A PRINTER VIA AN IMAGE CAPTURING DEVICE

BACKGROUND OF THE INVENTION

1. Field of the Invention

The present invention relates to an image forming apparatus in which a printer, a duplicating machine, etc., are connected to a communication network and a method of controlling the same. More particularly, the present invention relates to an image forming apparatus and a method of controlling the same capable of timely performing a print job of a user based on the movement of the user and of improving the convenience of users and security.

2. Description of the Related Art

Conventionally, a personal computer designates the number of print copies and a print range to a printer to perform printing. When a printer is connected to a network, the printer performs a printing process in the order of print commands received from a plurality of users requiring printing. Therefore, a paper outlet is piled up high with printed sheets required by the plurality of users. However, in recent years, since it has been strongly demanded to protect the security and privacy of users, user interfaces that require inputting a text ID or password at the time of printing have been widely used. For example, there is a print system having a private print function in which, when a personal computer instructs a print system to perform printing, a text ID, called an 'access name', is input through the personal computer, so that, when the 'access name' is not input, printing is not performed. However, the user interface has problems in that it is necessary to perform a character input operation on a personal computer side and a printer side and to memorize the 'access name'.

Therefore, it is demanded to timely provide a print service with respect to a print job issued by a user by determining that the user having issued the print job approaches a print or a print terminal to get a printout.

Further, there are JP-A-6-59010 and JP-A-2002-111924 as patent documents related to the present invention.

JP-A-6-59010 discloses a technique in which a CCD sensor is provided in an image forming apparatus to determine the moving direction or face of a person, thereby controlling a power supply/preheating function.

Furthermore, in JP-A-2002-111924, a camera captures a face of a person who is willing to use an image forming apparatus, and it is determined whether the image captured by the camera corresponds to a registered user. In this way, JP-A-2002-111924 controls whether to use the image forming apparatus.

However, JP-A-6-59010 and JP-A-2002-111924 do not disclose a technique of timely performing a print job issued by a user based on the approach of the user to a printer or a print terminal.

SUMMARY OF THE INVENTION

The present invention is designed to solve the above-mentioned problems, and provides an image forming technique capable of timely performing a print job issued by a user without leaving a printout alone for a long time, by determining that the user having issued the print job approaches a print or a print terminal to get the printout.

The present invention solves the problems by additionally providing an image capturing part such as a camera, a face detecting part, a face recognizing part, and a print permitting part to a printer. In order to supply image data to a face detecting part and a face recognizing part, the image capturing part is preferably arranged at a place suitable for acquiring the face information of a printer operator. In this way, the present invention can realize the following functions.

(1) A function of performing printing after confirming each person.

(2) A function of changing the priority of a print queue after confirming each person.

(3) A function of performing a print control after confirming each person.

For the function of performing printing after confirming each person, the face detecting part detects the approaching of a person who has issued a print instruction to the printer and then inputs a face image of the person to the face recognizing part, thereby obtaining the face recognition result. When the face recognizing part determines that the input face image corresponds to the person who has issued the print instruction, the print permitting part changes a print enable flag of the print instruction issued by the person from a disable state to an enable state, so that printout is automatically performed. In this case, it is necessary to register face recognition data onto the face recognizing part prior to performing the print instruction using a personal computer. In addition, the print enable flag of each print instruction is initially in the disable state.

For the function of changing the priority of a print queue after confirming each person, the face detecting part detects the approaching of a person who has issued a print instruction to the printer and then inputs a face image of the person to the face recognizing part, thereby obtaining the face recognition result. When the face recognizing part determines that the input face image corresponds to the person who has issued the print instruction, a previously registered print priority attribute of the person who has issued the print instruction and approached the printer and that of another person whose documents are currently being printed are checked and compared. As a result of the check, when the person who has issued the print instruction and approached the printer has a higher priority, the print enable flag of the print instruction is changed from the disable state to the enable state, and then the printing is automatically performed (the current printing job having a lower priority is changed to a hold state). After the printing having a higher priority is completed, the printing having a lower priority in the hold state returns to the print state.

For the function of performing a print control after confirming each person, the control is realized in a printer having a plurality of print outlets capable of restricting the carrying-out of documents. The face detecting part detects the approaching of a person who has issued a print instruction to the printer and then inputs a face image of the person to the face recognizing part, thereby obtaining the face recognition result. When the face recognizing part determines that the input face image corresponds to the person who has issued the print instruction, the lock of the print outlet where the printout of the person who has issued the print instruction is held is released, so that the printout can be carried out.

Further, the present invention will be described below.

According to an aspect of the present invention, an image forming apparatus in which a client terminal and a printer are connected to a communication network, includes an image capturing part provided in a vicinity of the printer, a recognizing part to sense a person approaching the printer and to recognize an identity of the person, based on a face image of an image captured by the image capturing part, and a control part to control the printer to perform a print job issued by the person, based on a recognition output from the recognizing part.

In this way, it is possible to appropriately process the print job of the user and the output thereof by detecting a user approaching to the printer and by specifying the user identity, and thus it is possible to provide a timely service and to improve security.

Further, for example, the control part processes the print job issued by the person based on the recognition output from the recognizing part.

Alternatively, the control part assigns a higher priority to the print job issued by the person in print queue, based on the recognition output from the recognizing part.

Furthermore, the control part release a print lock of the person based on the recognition output from the recognizing part.

Moreover, specifically, the recognizing part determines whether a person approaches the printer based on an arrangement region of the face image in the captured image, the moving direction of the face image, and the direction of the face in the face image.

Further, the recognizing part may determine whether the person approaches the printer based on the size of the face image.

Furthermore, the user identity is specified by comparing the registered feature amount of each user face to a feature amount extracted from the face image in the captured image. In addition, it is possible to adopt various well-known recognizing methods.

Moreover, an attribute indicating whether to perform print control based on the face recognition is added to the print job, and the control part may control the printer only when the attribute indicates the print control to be performed. The print job includes, according to the number of copies or an emergency, a job to be immediately printed as well as a job unnecessary to be immediately printed because it takes a long time to be printed, and so on. The user specifies whether to perform control as the print attribute, so that it is possible to cope with such a demand.

Further, the user may specify the contents of the print control.

Furthermore, the present invention can be realized by not only an apparatus or a system but a method. In addition, it goes without saying that a portion of the present invention may be formed in a software. Of course, a software product used for allowing a computer to execute the software is also included in the technical scope of the present invention.

The above-mentioned aspects and other aspects of the present invention will be explained in detail using the following embodiment described in the appended claims.

According to the present invention, it is possible to appropriately process the print job of the user and the output thereof by detecting a user approaching the printer and by specifying the user identity, and thus it is possible to provide a timely service and to improve security.

BRIEF DESCRIPTION OF THE DRAWINGS

Preferred embodiments of the present invention will be described in detail based on the following figures, wherein.

DETAILED DESCRIPTION OF THE INVENTION

Hereinafter, preferred embodiments of the present invention will be described with reference to the accompanying drawings.

Figure 1:
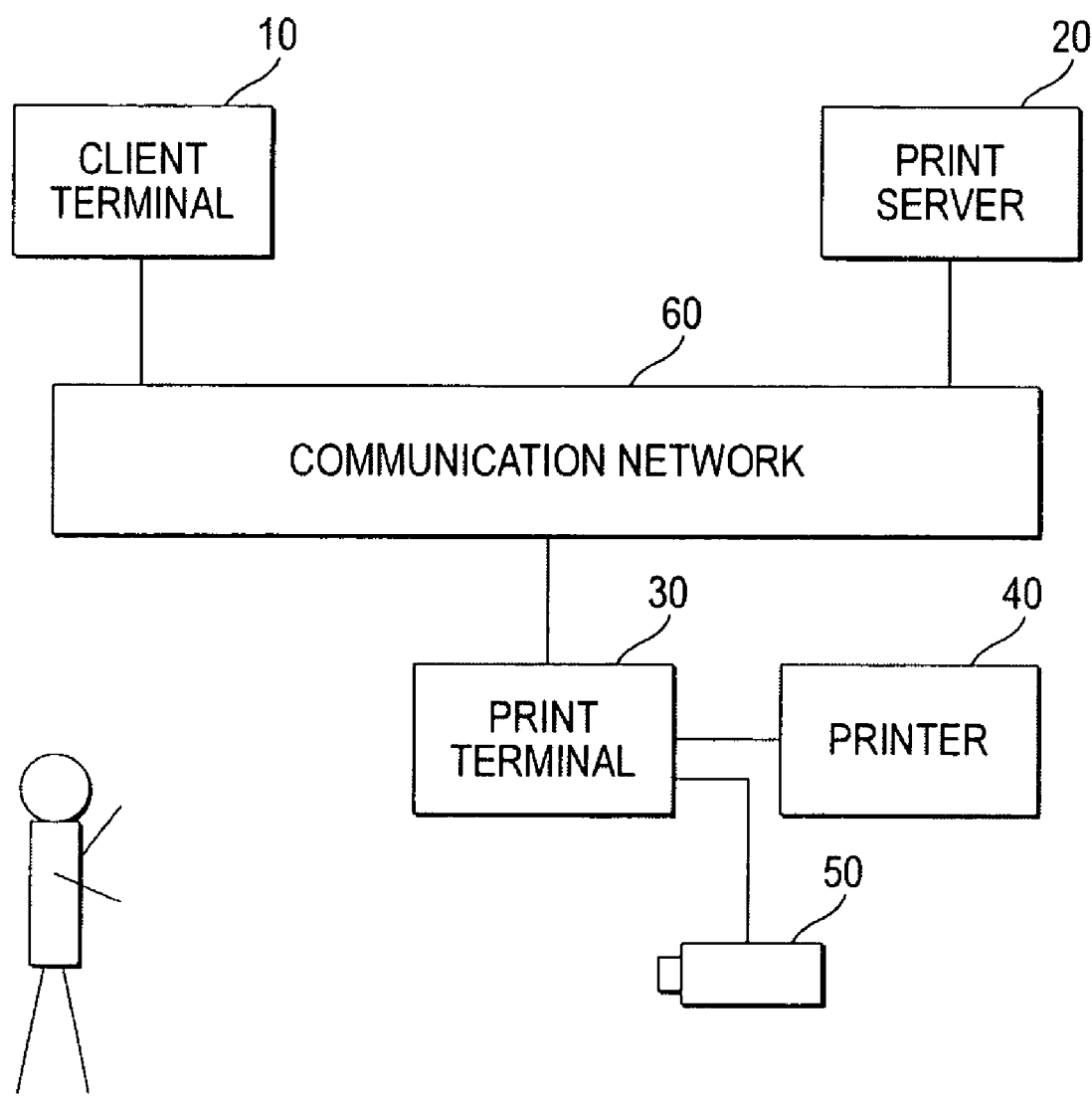
FIG. 1 is a view illustrating the overall structure of an image forming system according to an embodiment of the present invention.

FIG. 1 shows the overall structure of an image forming system according to an embodiment of the present invention. In FIG. 1, a client terminal 10, a print server 20, a print terminal 30, and the like are connected to a communication network 60. The communication network 60 may be a LAN, a wide area network, or the like. A printer 40 and a video camera 50 are connected to the print terminal 30. The video camera 50 is arranged to determine the approaching of a user to the printer 40. A plurality of the video cameras 50 may be provided.

The client terminal 10 is an information terminal such as a personal computer, and functions to specify a print file and to transmit a print job to the print server 20 or the printer 40. The client terminal 10 may be a fixed terminal, a movable terminal, or a mobile communication apparatus. When a print job is transmitted to the print server 20, the print job is held in a spool of the print server 20 and is then printed out from the corresponding printer 40 by operating the print terminal 30 or another print terminal (not shown). The print job transmitted to the printer 40 is held in the spool thereof or a spool of the print terminal 30. In this case, the print jobs held in the spools of the printer 40 and the print terminal 30 can be performed in the waiting order or can be suspended by enable and disable flags. In the present embodiment, the disable flag is set to suspend the printing.

Figure 4:
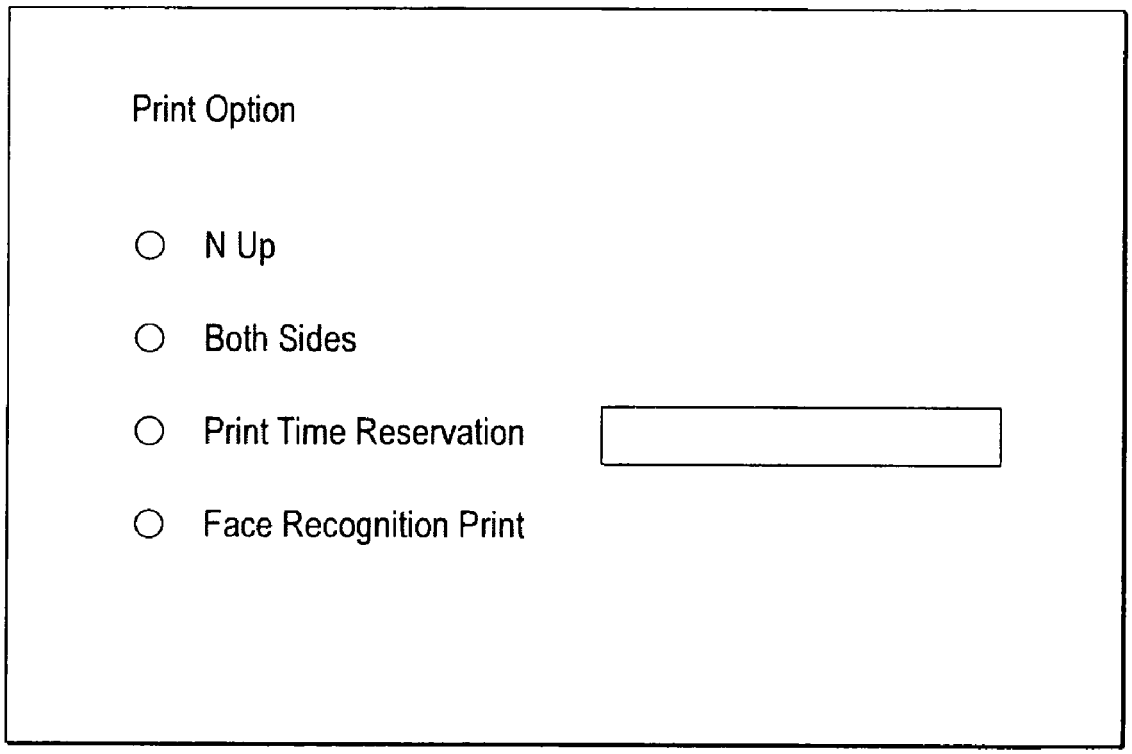
FIG. 4 is a view illustrating an example of a user interface screen of a print option in the embodiment of the present invention.

Further, for example, the user can set various print options using a print option screen shown in FIG. 4. Although the present invention is not limited to the example shown in FIG.4, in the present embodiment, it is possible to set various printing modes, such as an N up mode (a mode for printing a plurality of pages on a sheet of paper), a both side printing mode, a print time reservation, a face recognition print, etc. When the face recognition print is selected, a face recognition print attribute is turned on, so that the corresponding print job can be controlled based on the face recognition. When the face recognition print attribute is in an off state, control is disabled based on the face recognition. Further, control may be set to on or off state for every user, not every print job, based on the face recognition.

The print terminal 30 performs a print job in the spool of the printer 40. For example, the print terminal 30 can output a print job from the printer 40 or can output a print job in the spool of the print server 20 to the printer 40. Further, the print terminal 30 functions to remove the print job and to change attributes. In general, the print terminal 30 performs certification by a password or a card. Of course, it is also possible to set the print terminal 30 not to perform the certification according to a required security level or user's convenience.

The printer 40 is typically a xerography-type image output apparatus, but may have a duplicating function, an image inputting function, and a facsimile function. The printer 40 has a print control mechanism. For example, when the user logging in the print terminal 30 has a carrying-out authority (the owner of a print job), the lock of the print control mechanism of the printer 40 is released. In the present embodiment, the print control mechanism is released based on the face recognition.

Figure 2:
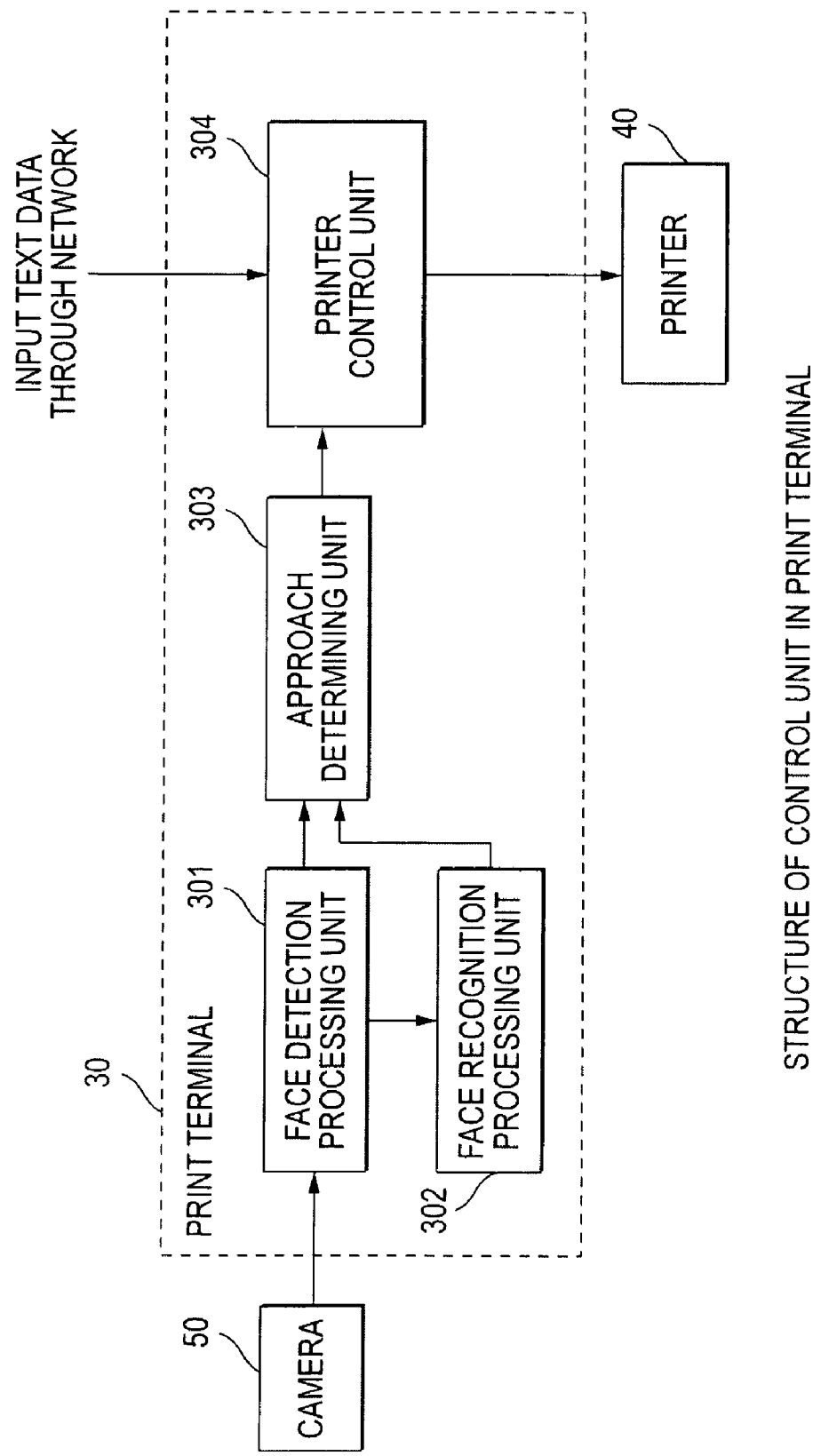
FIG. 2 is a block diagram illustrating the structure of the main part of the embodiment of the present invention.

FIG. 2 is a view schematically showing a functional block of the print terminal 30. In FIG. 2, the print terminal 30 includes a face detection processing unit 301, a face recognition processing unit 302, an approach determining unit 303, a printer control unit 304, etc. Although not shown, the print terminal 30 has an operation/display unit composed of a liquid crystal panel and provides various interfaces for a user. The face detection processing unit 301 determines whether a face image is present in a captured image. For example, after determining the face, the face detection processing unit 301 detects, for example, the midpoint position and movement of the face. Further, the face detection processing unit 301 determines the direction or size of the face. The face recognition processing unit 302 extracts a feature amount from the face image and matches it with the feature amount of each registered user to output a user identity (user ID). The approach determining unit 303 outputs a signal indicating an approached state and the user ID, based on the outputs from the face detection processing unit 301 and the face recognition processing unit 302. The printer control unit 304 starts to perform a print job of the user based on the user ID.

The printer starts to perform an image process by detecting a user approaching the printer.

An approach detecting method is as follows, but is not limited thereto.

Figure 3:
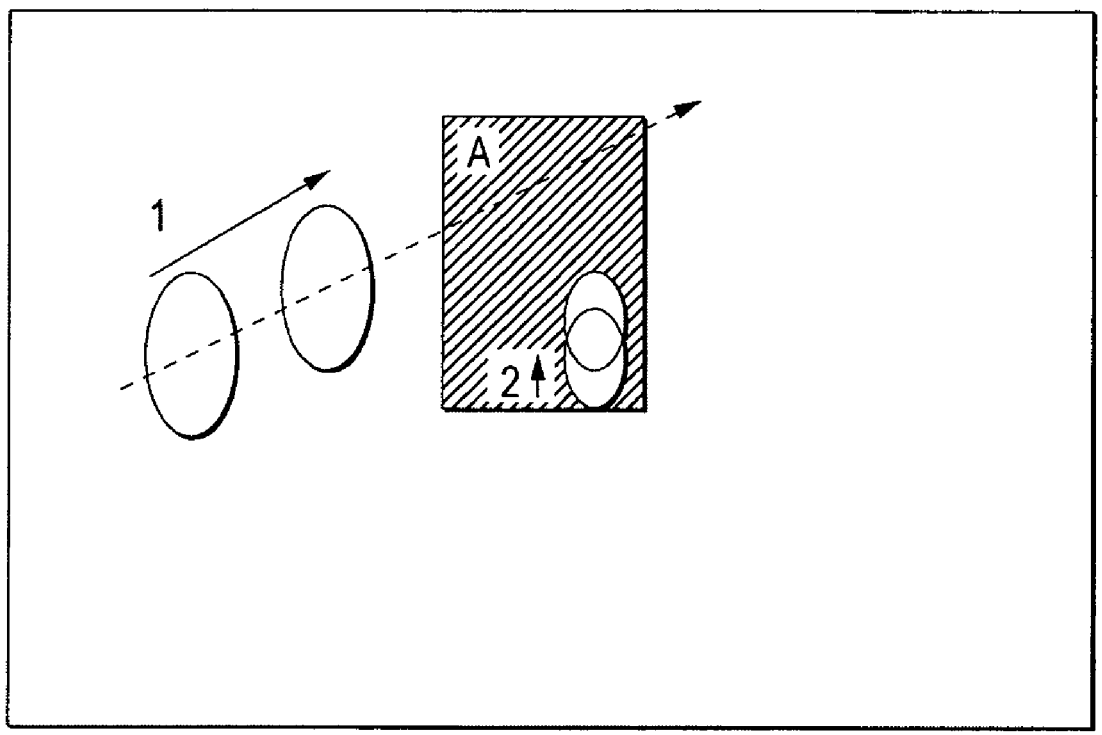
FIG. 3 is a view illustrating an algorithm for determining the approach of a face image in the embodiment of the present invention.

A face detecting process is performed on image data obtained by a camera 50 arranged in a vicinity of the printer 40. After the face is detected, the position, size, and direction of the face are output to the approach determining unit 303. Further, the detected face image is output to the face recognition processing unit 302. Then, the face recognition processing unit 302 determines whose the detected face is. The approach determining unit 303 first detects a moving direction of a specific face in an image frame by the difference between the output time-sequentially transmitted from the face recognition processing unit 302 and the central position of the face input from the face detection processing unit 301. When the central position of the face is outside a region A (FIG. 3) set in the image frame, a moving direction thereof traverses the region A set in the image frame, and the direction of the face is within a predetermined angle range, it is determined that a specific face is in an approaching state (which is represented by reference numeral '1' in FIG. 3). Further, when the central position of the face is within the region A set in the image frame, the size of the face is smaller than a predetermined size, and the direction of the face is within a predetermined angle range, it is determined that a specific face is in the approaching state (which is represented by reference numeral '2' in FIG. 3). When the approach determining unit 303 determines that a face approaches, it outputs to the printer control unit a signal indicating an approaching state and the previously registered user ID of approaching user.

When the signal indicating an approaching state and a code number are input, the printer control unit 304 retrieves a text having the same user ID from text data that is transmitted through a network to which a code number is previously given and is held in a storage device (not shown) of the printer control unit 304, and then outputs it to the printer 40. In this case, the printer control unit 304 performs a process of decoding the text data and a rasterizing process.

Hereinafter, the operation of the embodiment according to the present invention will be described in detail.

Figure 5:
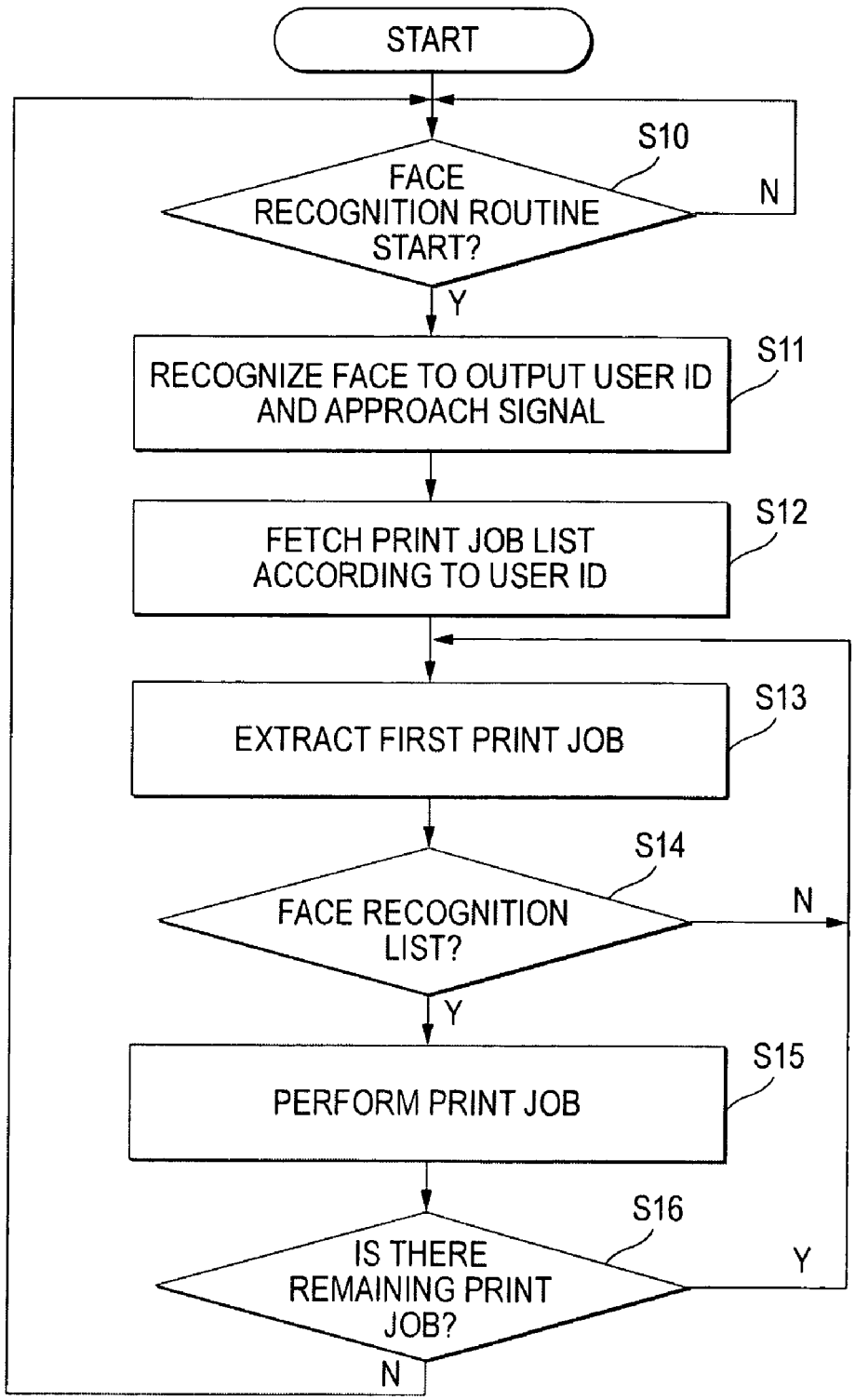
FIG. 5 is a flow chart illustrating the overall operation of the embodiment of the present invention.

FIG. 5 is a flow chart illustrating the overall operation, and the following steps are performed.

[Step S10]: After determining that a face image is included in a captured image, an approach determining routine starts.

[Step S11]: The approach determining routine (FIGS. 6 and 7) is performed to output a user ID and an approach signal.

[Step S12]: A print job list is fetched according to the user ID. Further, jobs in the spool of the print sever 20 as well as the jobs in the spool of the printer 40 or the print terminal 30 may be included in an object to be printed. In this case, the information of the print job is received from the print server 20.

[Step S13]: A first job is extracted from the fetched print jobs.

[Step S14]: It is determined whether a face recognition print attribute is present. When the face recognition print attribute is present, Step S15 is performed. On the other hand, when it is absent, the process returns to Step S13, and Steps S13 and S14 are repeatedly performed.

[Step S15]: A print job is performed using the printer 40.

[Step S16]: When the remaining job is present, the process returns to Step S13, and Steps S13 to S16 are repeatedly performed. On the other hand, when the remaining is absent, the process returns to Step S10.

Figure 6:
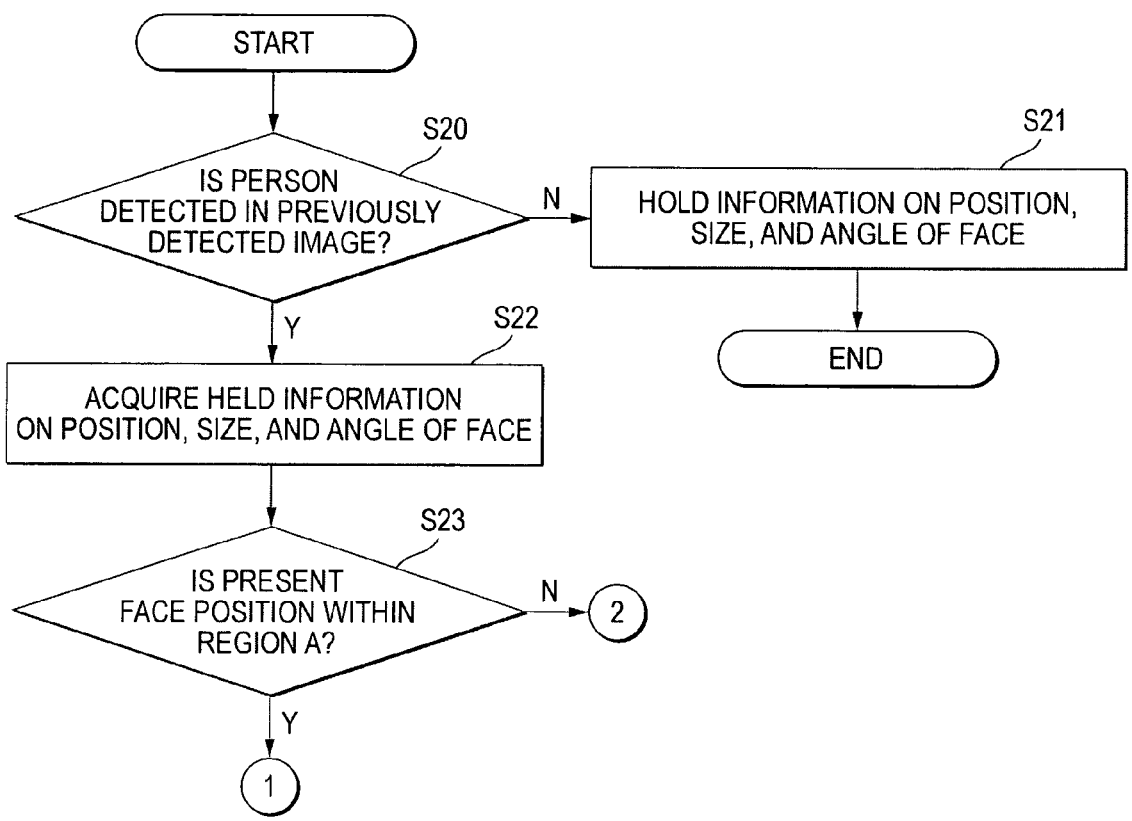
FIG. 6 is a portion of a flow chart illustrating the operation of an approach determining routine according to the embodiment of the present invention.
Figure 7:
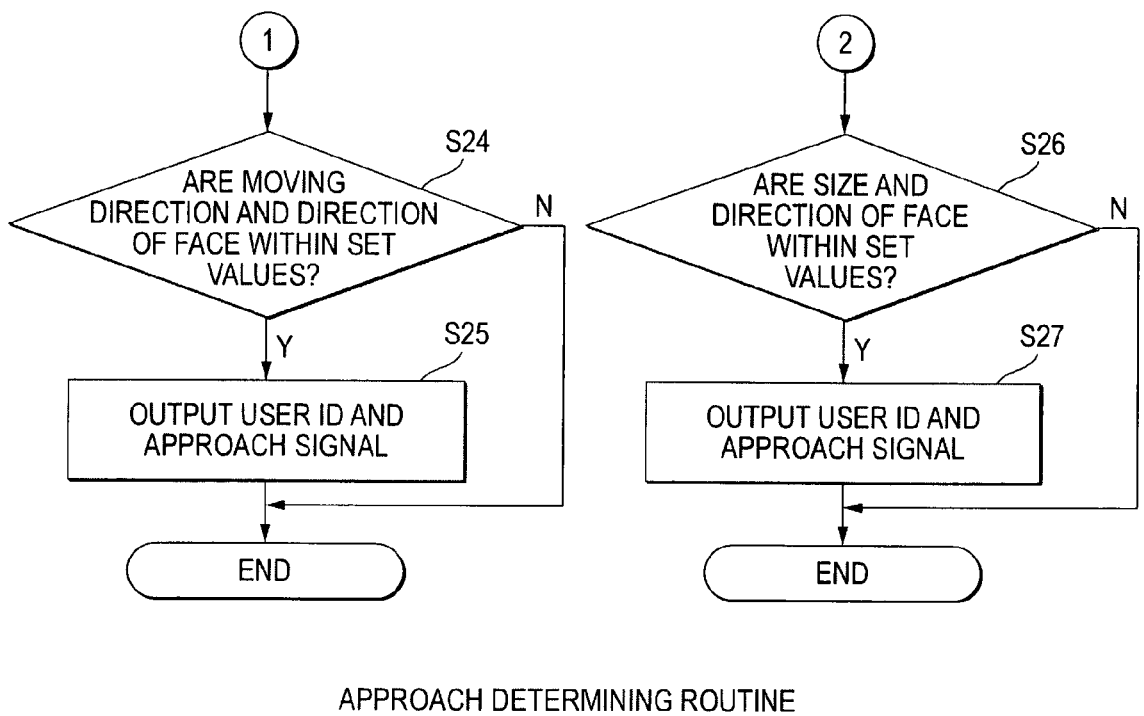
FIG. 7 is another portion of the flow chart illustrating the operation of the approach determining routine according to the embodiment of the present invention.

FIGS. 6 and 7 are flow charts illustrating the operation of the approach determining routine (S11) in detail, and the process thereof is performed as follows. Further, the face image is processed at a predetermined short interval.

[Step S20]: It is determined whose the previously detected face image is. When there is no user corresponding to the previously detected face image, Step S21 is performed. When there is a user corresponding to the previously detected face image, Step S22 is performed.

[Step S21]: When there is no user corresponding to the previously detected face image, information on the position, size, and angle of the face is held as a new detection entry.

[Step S22]: The held information on the position, size, and angle of the face is acquired.

[Step S23]: It is determined whether the present face position is within the region A. When the position is within the region A, Step S24 is performed. On the other side, when the position is outside the region A, Step S26 is performed.

[Step S24]: It is determined whether the moving direction and the direction of the face are within set values. As a result, if within the set values, Step S25 is performed. On the other hand, if not within the set values, the process is completed.

[Step S25]: The user ID and the approach signal are output, and then the process is completed.

[Step S26]: It is determined whether the size and direction of the face are within set values. As a result, if within the set values, Step S27 is performed. On the other hand, if not within the set values, the process is completed.

[Step S27]: The user ID and the approach signal are output, and then the process is completed.

In the above-mentioned operation, control when the print job is executed is described. In addition, a change in the priority of the spool of the print job and the print control mechanism are controlled in the same manner.

The complete description of the embodiments of the present invention has been described as elaborated above.

Further, the present invention is not limited to the above-mentioned embodiment, and various modifications and changes can be made without departing from the scope and spirit of the present invention. For example, as described above, the image forming apparatus is described as an example of the present invention, but the present invention can be applied to service providing apparatuses, such as a vending machine and an article storing apparatus. For example, it is possible to directly receive a desired article, by specifying an article which will be delivered and then determining the article approaching to the apparatus.

Figure 8:
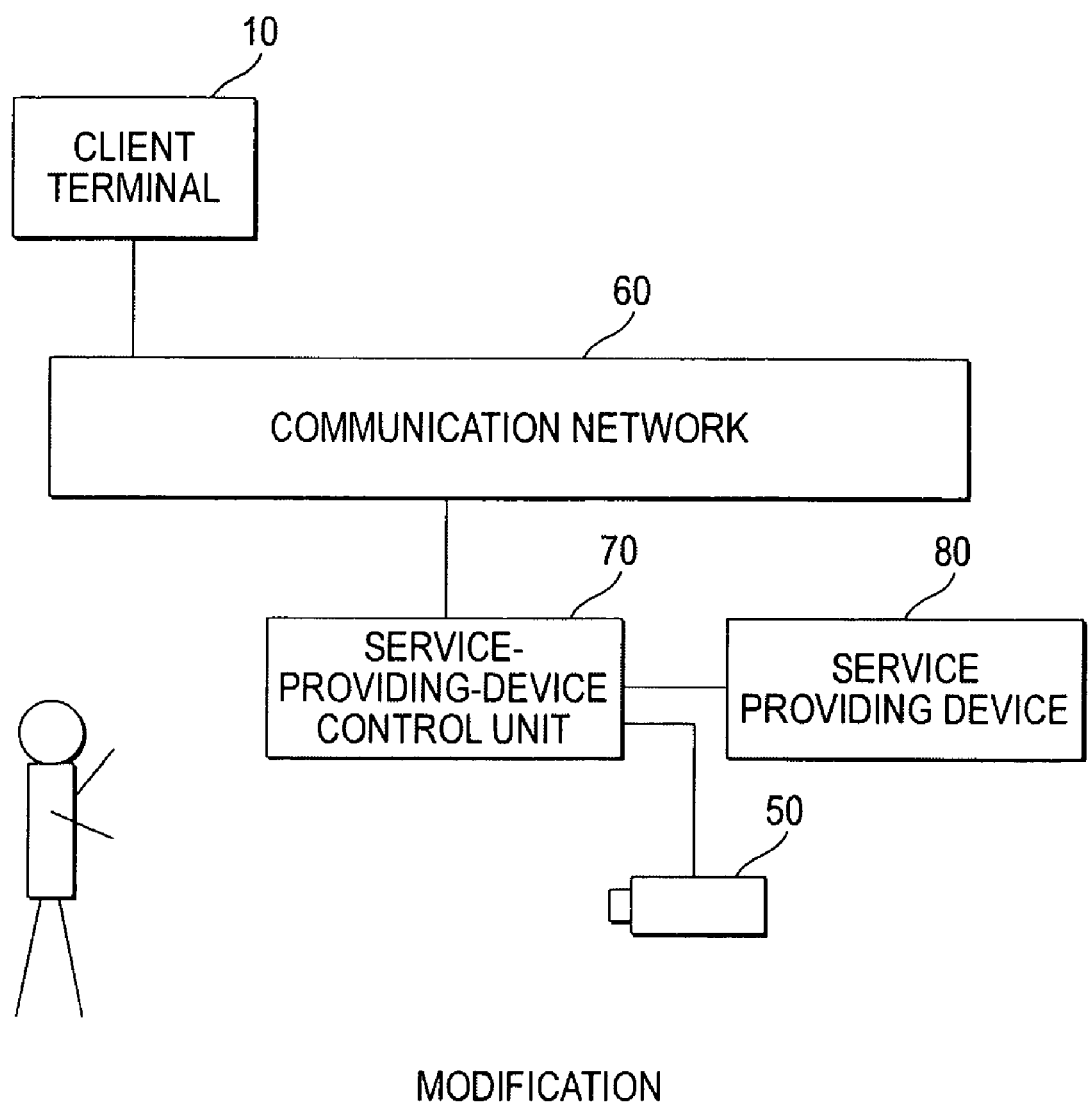
FIG. 8 is a view illustrating a modification of the embodiment of the present invention.

FIG. 8 is a view illustrating the structure of such a service providing system. In FIG. 8, the same components as those in FIG. 1 have the same reference numerals. In the service providing system shown in FIG. 8, a service providing device 80 is controlled by a service-providing-device control unit 70, so that each service providing process is controlled based on the face image, similar to the above.

What is claimed is:

1. An image forming apparatus for controlling a printer based on a print job issued by a client terminal, the printer and the client terminal being connected to a communication network, the image forming apparatus comprising:
    an image capturing part that is provided in a vicinity of the printer and that provides image data;
    a face detection part that receives the image data, detects a face in the image data, and outputs a position, size, and orientation of the face;
    a recognizing part that recognizes an identity of a person based on the face detected by the face detection part;
    an approach determining part that receives the position, size, and orientation of the face, detects a moving direction of the face in an image frame of the image data, and automatically detects a person approaching the printer; and
    a control part that controls the printer to perform the print job issued by the client terminal according to an instruction of the identified person, based on a recognition output from the recognizing part.

2. The image forming apparatus according to claim 1, wherein the control part processes the print job issued by the client terminal according to an instruction of the identified person, based on the recognition output from the recognizing part.

3. The image forming apparatus according to claim 1, wherein the control part assigns a higher priority in print queue to the print job issued by the client terminal according to an instruction of the identified person, based on the recognition output from the recognizing part.

4. The image forming apparatus according to claim 1, wherein the control part releases a print lock of the printer based on the recognition output from the recognizing part, the print lock being a state of the printer that prohibits taking out a record medium from that printer, the record medium being printed out from that printer.

5. The image forming apparatus according to claim 1, wherein the recognizing part determines whether a person approaches the printer based on an arrangement region of the face image in the captured image, a moving direction of the face image, and an orientation of the face in the face image.

6. The image forming apparatus according to claim 5, wherein the recognizing part determines whether the person approaches the printer based on a size of the face image in the captured image.

7. The image forming apparatus according to claim 1, wherein an attribute indicating whether to perform print control of the printer based on a face recognition is added to the print job, and
    the control part controls the printer, only when the attribute indicates the print control to be performed.

8. The image forming apparatus according to claim 7, wherein an attribute value indicating the print control to be performed specifies contents of the print control.

9. The image forming apparatus according to claim 1, wherein automatically detecting a person approaching the printer includes:
    detecting a moving direction of the face in an image frame of the image data by a difference between an output time-sequentially transmitted from the recognizing part and a central position of the face input from the face detection part.

10. An image formation control method for an image forming apparatus for controlling a printer based on a print job issued by a client terminal, the printer and the client terminal being connected to a communication network, the method comprising:
    outputting image data captured by an image capturing part provided in a vicinity of the printer;
    detecting a face in the outputted image data, and outputting a position, size, and orientation of the face;
    recognizing an identity of a person based on the detected face;
    detecting a person approaching the image forming apparatus by detecting a moving direction of the face in an image frame of the image data based on the outputted position, size, and orientation of the face; and
    controlling the printer to perform a print job issued by the client terminal according to an instruction of the identified person, based on the recognized identify of the person in the detected face.

11. The image formation control method according to claim 10, wherein detecting a person approaching the image forming apparatus includes:
    detecting a moving direction of the face in an image frame of the image data by a difference between an output time-sequentially transmitted by the recognizing step and a central position of the face output by the detecting a face step.

12. A service providing system for controlling a service providing device based on a service request issued by a client terminal, the service providing device and the client terminal being connected to a communication network, the service providing system comprising:
    an image capturing part that is provided in a vicinity of the service providing device and that provides image data;
    a face detection part that receives the image data, detects a face in the image data, and outputs a position, size, and orientation of the face;
    a recognizing part that recognizes an identity of a person, based on the face detected by the face detection part;
    an approach determining part that receives the position, size, and orientation of the face, detects a moving direction of the face in an image frame of the image data, and automatically detects a person approaching the service providing device; and
    a control part that controls the service providing device to perform a service request issued by the client terminal according to an instruction of the identified person, based on a recognition output from the recognizing part.

13. The service providing system according to claim 12, wherein automatically detecting a person approaching the service providing device includes:

detecting a moving direction of the face in an image frame of the image data by a difference between an output time-sequentially transmitted from the recognizing part and a central position of the face input from the face detection part.

* * * * *